United States Patent
Tanaka et al.

(10) Patent No.: US 10,377,650 B2
(45) Date of Patent: Aug. 13, 2019

(54) MEMBRANE SEPARATION TYPE ACTIVATED SLUDGE TREATMENT METHOD AND SYSTEM

(71) Applicant: SUMITOMO ELECTRIC INDUSTRIES, LTD., Osaka-shi, Osaka (JP)

(72) Inventors: Hiromu Tanaka, Osaka (JP); Hiroko Miki, Osaka (JP); Tomoyuki Yoneda, Osaka (JP); Toru Morita, Osaka (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 15/756,206

(22) PCT Filed: Sep. 28, 2016

(86) PCT No.: PCT/JP2016/078696
§ 371 (c)(1),
(2) Date: Feb. 28, 2018

(87) PCT Pub. No.: WO2017/057501
PCT Pub. Date: Apr. 6, 2017

(65) Prior Publication Data
US 2018/0282188 A1    Oct. 4, 2018

(30) Foreign Application Priority Data
Oct. 1, 2015 (JP) .................... 2015-195665

(51) Int. Cl.
*C02F 3/00* (2006.01)
*C02F 3/12* (2006.01)
(Continued)

(52) U.S. Cl.
CPC .......... *C02F 3/1273* (2013.01); *B01D 63/026* (2013.01); *B01D 63/04* (2013.01);
(Continued)

(58) Field of Classification Search
CPC ........ C02F 3/1273; C02F 3/006; B01D 3/043; B01D 63/026; B01D 65/02; B01D 63/04
See application file for complete search history.

(56) References Cited

U.S. PATENT DOCUMENTS

| 8,377,305 | B2* | 2/2013 | Zha ..................... B01D 61/20 134/22.12 |
| 2007/0084795 | A1* | 4/2007 | Jordan ................... B01D 61/22 210/652 |

(Continued)

FOREIGN PATENT DOCUMENTS

| JP | 2010-253355 A | 11/2010 |
| JP | 2012-528717 A | 11/2012 |
| WO | WO-2010/141560 A1 | 12/2010 |

*Primary Examiner* — Chester T Barry
(74) *Attorney, Agent, or Firm* — Drinker Biddle & Reath LLP (57) ABSTRACT

A membrane separation type activated sludge treatment method according to an aspect of the present invention includes a step of performing biological treatment on waste water and a step of performing membrane separation on water having been treated in the biological treatment step. The membrane separation step employs a plurality of filtration modules including a plurality of hollow fiber membranes arranged adjacent to one another and oriented in one direction and a pair of holding members fixing both ends of the plurality of hollow fiber membranes, and a plurality of cleaning modules supplying air bubbles from beneath the filtration modules. An amount of treated water sucked by the filtration modules and an amount of air bubbles supplied by (Continued)

the cleaning modules are varied in response to variations in an inflow rate of the waste water in the biological treatment step.

6 Claims, 3 Drawing Sheets

(51) Int. Cl.
  *B01D 63/04* (2006.01)
  *B01D 65/02* (2006.01)
  *B01D 63/02* (2006.01)
(52) U.S. Cl.
  CPC ........... *B01D 63/043* (2013.01); *B01D 65/02* (2013.01); *C02F 3/006* (2013.01); *B01D 2311/16* (2013.01); *B01D 2311/2688* (2013.01); *B01D 2315/06* (2013.01); *B01D 2319/04* (2013.01); *B01D 2321/185* (2013.01); *B01D 2321/205* (2013.01); *C02F 2209/38* (2013.01); *C02F 2209/40* (2013.01); *C02F 2301/08* (2013.01); *C02F 2303/16* (2013.01); *Y02W 10/15* (2015.05)

(56) References Cited

U.S. PATENT DOCUMENTS

| | | | |
|---|---|---|---|
| 2013/0001159 A1* | 1/2013 | Reid | C02F 3/30 210/605 |
| 2014/0262732 A1* | 9/2014 | Conway | B01D 3/4294 203/4 |
| 2017/0120199 A1* | 5/2017 | Moon | B01D 61/18 |

* cited by examiner

MEMBRANE SEPARATION TYPE ACTIVATED SLUDGE TREATMENT METHOD AND SYSTEM

TECHNICAL FIELD

The present invention relates to a membrane separation type activated sludge treatment method and a membrane separation type activated sludge treatment system. The present application claims priority based on Japanese Patent Application No. 2015-195665 filed on Oct. 1, 2015, the entire contents of which are incorporated herein.

BACKGROUND ART

The purification treatment for effluents such as industrial waste water, animal sewage, and sewage water often employs activated sludge processes, which have high treatment efficiency. In particular, a process attracting attention is a membrane separation type activated sludge process (MBR process), which performs separation between treated water and sludge not by the conventional precipitation method, but with a microfiltration membrane (MF membrane) or an ultra filtration membrane (UF membrane). Examples of a purification treatment system employing this membrane separation type activated sludge process include a system that includes an aeration tank and a membrane separation tank as separate tanks, and a one-tank system in which a filtration membrane is immersed in a reactor.

The aeration tank is a tank where a large amount of microbes grown are used to capture and consume contamination substances that are mainly organic substances in effluent, to thereby purify the effluent. Flocs of such microbes having the capability of purifying effluent are referred to as activated sludge. The aeration means supplying of air to water to thereby supply oxygen. Some microbes require oxygen to live, and, in the activated sludge process, aeration is performed by supplying air to the aeration tank with a blower from the bottom portion of the aeration tank or by stirring the surface in the aeration tank.

The filtration membrane, which separates purified water (treated water) and activated sludge from each other in the aeration tank, is unavoidably subjected to clogging (fouling) due to adhesion of activated sludge to the surface of the filtration membrane. For this reason, it has been proposed that activated sludge adhering to the surface of the filtration membrane is removed by supplying air bubbles from beneath the filtration membrane and scrubbing the surface of the filtration membrane with the air bubbles (for example, refer to Japanese Unexamined Patent Application Publication No. 2010-253355).

To reduce clogging of the filtration membranes, it is necessary to regulate flux per unit area of the treated water that passes through the filtration membranes to less than or equal to a certain value. Accordingly, the above publication discloses an apparatus structure in which the waste water (raw water) can be temporarily stored in an adjusting tank and supplied to an activated sludge tank at a constant flow rate. When the inflow rate of the waste water exceeds a certain amount, the membrane separation type activated sludge treatment system according to the related art stores the excess waste water in the adjusting tank. Then, when the inflow rate of the waste water becomes lower than the certain amount, the membrane separation type activated sludge treatment system according to the related art supplies the waste water stored in the adjusting tank to the activated sludge tank together with the waste water that flows into the activated sludge tank. Thus, variation in the amount of waste water treated in the activated sludge tank per unit time is reduced.

Because variation in the amount of waste water treated in the activated sludge tank per unit time is reduced, the membrane separation type activated sludge treatment system according to the related art can be designed to have a maximum filtration performance lower than the maximum inflow rate of the waste water. Therefore, the total volume of the filtration membranes included in a filtration module to be installed can be reduced, and the operating energy consumption of the membrane separation type activated sludge treatment system according to the related art can be reduced accordingly.

CITATION LIST

Patent Literature

PTL 1: Japanese Unexamined Patent Application Publication No. 2010-253355

SUMMARY OF INVENTION

A membrane separation type activated sludge treatment method according to an aspect of the present invention includes a step of performing biological treatment on waste water and a step of performing membrane separation on water having been treated in the biological treatment step. The membrane separation step employs plural filtration modules including plural hollow fiber membranes arranged adjacent to one another and oriented in one direction and a pair of holding members fixing both ends of the plural hollow fiber membranes, and plural cleaning modules supplying air bubbles from beneath the filtration modules. An amount of treated water sucked by the filtration modules and an amount of air bubbles supplied by the cleaning modules are varied in response to variations in an inflow rate of the waste water in the biological treatment step.

In addition, a membrane separation type activated sludge treatment system according to another aspect of the present invention includes a tank configured to perform biological treatment on waste water, and an apparatus configured to perform membrane separation on water having been treated in the biological treatment tank. The membrane separation apparatus includes plural filtration modules including plural hollow fiber membranes arranged adjacent to one another and oriented in one direction and a pair of holding members fixing both ends of the plural hollow fiber membranes, and plural cleaning modules supplying air bubbles from beneath the filtration modules. An amount of treated water sucked by the filtration modules and an amount of air bubbles supplied by the cleaning modules are varied in response to variations in an inflow rate of the waste water into the biological treatment tank.

DESCRIPTION OF EMBODIMENTS

Problem to be Solved by Present Disclosure

In the membrane separation type activated sludge treatment system according to the related art disclosed in the above-described publication, an adjusting tank having a capacity sufficient to absorb the variation in the inflow rate of the waste water is required to enable stable treatment of the waste water. However, in a factory or the like that operates only during the day, for example, the inflow rate of the waste water greatly varies, and installation of an adjusting tank having a sufficient capacity leads to a large increase in the equipment cost.

The present invention has been made in light of the above-described circumstances, and its object is to provide a membrane separation type activated sludge treatment method and a membrane separation type activated sludge treatment system by which operating energy consumption can be reduced and variation in the inflow rate of the waste water can be accommodated without using an adjusting tank.

Advantageous Effects of Present Disclosure

According to a membrane separation type activated sludge treatment method according to an aspect of the present invention and a membrane separation type activated sludge treatment system according to another aspect of the present invention, operating energy consumption can be reduced and variation in the inflow rate of the waste water can be accommodated without using an adjusting tank.

Description of Embodiments of Present Invention

A membrane separation type activated sludge treatment method according to an aspect of the present invention includes a step of performing biological treatment on waste water and a step of performing membrane separation on water having been treated in the biological treatment step. The membrane separation step employs plural filtration modules including plural hollow fiber membranes arranged adjacent to one another and oriented in one direction and a pair of holding members fixing both ends of the plural hollow fiber membranes, and plural cleaning modules supplying air bubbles from beneath the filtration modules. An amount of treated water sucked by the filtration modules and an amount of air bubbles supplied by the cleaning modules are varied in response to variations in an inflow rate of the waste water in the biological treatment step.

In the membrane separation type activated sludge treatment method, by varying the amount of treated water sucked by the filtration modules in response to variation in the inflow rate of the waste water in the biological treatment step, the outflow of the treated water is regulated so that the flux of the untreated water that passes through the hollow fiber membranes does not exceed the flow rate at which clogging of the hollow fiber membranes occurs. Accordingly, the membrane separation type activated sludge treatment method does not require any adjusting tank. In addition, in the membrane separation type activated sludge treatment method, the amount of treated water sucked by the filtration modules and the amount of air bubbles supplied by the cleaning modules are varied in response to variation in the inflow rate of the waste water in the biological treatment step. Therefore, the energy required to suck the treated water and supply the air bubbles can be minimized. Thus, according to the membrane separation type activated sludge treatment method, operating energy consumption can be reduced and variation in the inflow rate of the waste water can be accommodated without using an adjusting tank.

The amount of air bubbles supplied by the cleaning modules is preferably varied so that a variation rate of the amount of air bubbles supplied by the cleaning modules is greater than a variation rate of the amount of suction by the filtration modules. The inventors of the present invention have found that when, for example, the amount of suction by the filtration modules is halved, the cleaning performance required to clean the filtration modules can be maintained even when the amount of air bubbles supplied to the filtration modules is reduced to less than half. Therefore, by setting the variation rate of the amount of air bubbles supplied by the cleaning modules to be greater than the variation rate of the amount of suction by the filtration modules, operating energy consumption can be reduced while maintaining the cleaning performance required to clean the filtration modules. Here, the "variation rate" is a value given by $(V_1-V_0)/V_0$, where $V_0$ is the amount of air bubbles supplied or the amount of suction and $V_1$ is the amount of air bubbles supplied or the amount of suction after a unit time, for example, 1 min.

A ratio of an hourly average amount of air bubbles supplied by the cleaning module to a standard amount of air bubbles supplied by the cleaning modules when treating a daily average inflow rate of waste water is preferably in a range from 0.1 to 4. When the ratio of the hourly average amount of air bubbles supplied by the cleaning modules is within the above-described range, operating energy consumption can be further reduced while maintaining the cleaning performance. Here, the "hourly average" is an amount calculated by dividing an integrated value for one hour by unit time, and the "daily average" is the average of the hourly averages within a period of 12 hours before and after the time at which the above-described hourly average is calculated. In addition, the "standard amount of air bubbles supplied when treating a daily average inflow rate of waste water" is the amount of air bubbles set to be supplied by the cleaning modules when the inflow rate of the waste water in the biological treatment step is equal to the daily average inflow rate, and may be, for example, an average amount of air bubbles supplied by the cleaning modules when the inflow rate of the waste water in the biological treatment step is equal to the daily average inflow rate in the time period in which the daily average is calculated.

A ratio of an hourly average inflow rate of the waste water to a daily average inflow rate of the waste water in the biological treatment step is preferably in a range from 0.2 to 2. When the ratio of the hourly average inflow rate of the waste water is within the above-described range, reduction in the activated sludge can be inhibited, and operating energy consumption can be further reduced.

Preferably, the plural filtration modules and the plural cleaning modules are continuously operated. When the plural filtration modules and the plural cleaning modules are continuously operated, operating energy consumption can be further reduced than when intermittent operation is performed.

A membrane separation type activated sludge treatment system according to another aspect of the present invention includes a tank configured to perform biological treatment on waste water, and an apparatus configured to perform membrane separation on water having been treated in the biological treatment tank. The membrane separation apparatus includes plural filtration modules including plural hollow fiber membranes arranged adjacent to one another and oriented in one direction and a pair of holding members fixing both ends of the plural hollow fiber membranes, and plural cleaning modules supplying air bubbles from beneath the filtration modules. An amount of treated water sucked by the filtration modules and an amount of air bubbles supplied by the cleaning modules are varied in response to variations in an inflow rate of the waste water into the biological treatment tank.

In the membrane separation type activated sludge treatment system, by varying the amount of treated water sucked by the filtration modules in response to variation in the inflow rate of the waste water into the biological treatment tank, the outflow of the treated water is regulated so that the flux of the untreated water that passes through the hollow fiber membranes does not exceed the flow rate at which clogging of the hollow fiber membranes occurs. Accordingly, the membrane separation type activated sludge treatment system does not require any adjusting tank. In addition, in the membrane separation type activated sludge treatment system, the amount of treated water sucked by the filtration modules and the amount of air bubbles supplied by the cleaning modules are varied in response to variation in the inflow rate of the waste water into the biological treatment tank. Therefore, the energy required to suck the treated water and supply the air bubbles can be minimized. Thus, according to the membrane separation type activated sludge treatment system, operating energy consumption can be reduced and variation in the inflow rate of the waste water can be accommodated without using an adjusting tank.

Preferably, no tank for adjusting the inflow rate of the waste water into the biological treatment tank is provided. When no tank for adjusting the inflow rate of the waste water into the biological treatment tank is provided, the equipment cost can be reduced.

Detailed Description of Embodiment of Present Invention

A membrane separation type activated sludge treatment system according to an embodiment of the present invention will now be described in detail with reference to the drawings.

[Membrane Separation Type Activated Sludge Treatment System]

Figure 1:
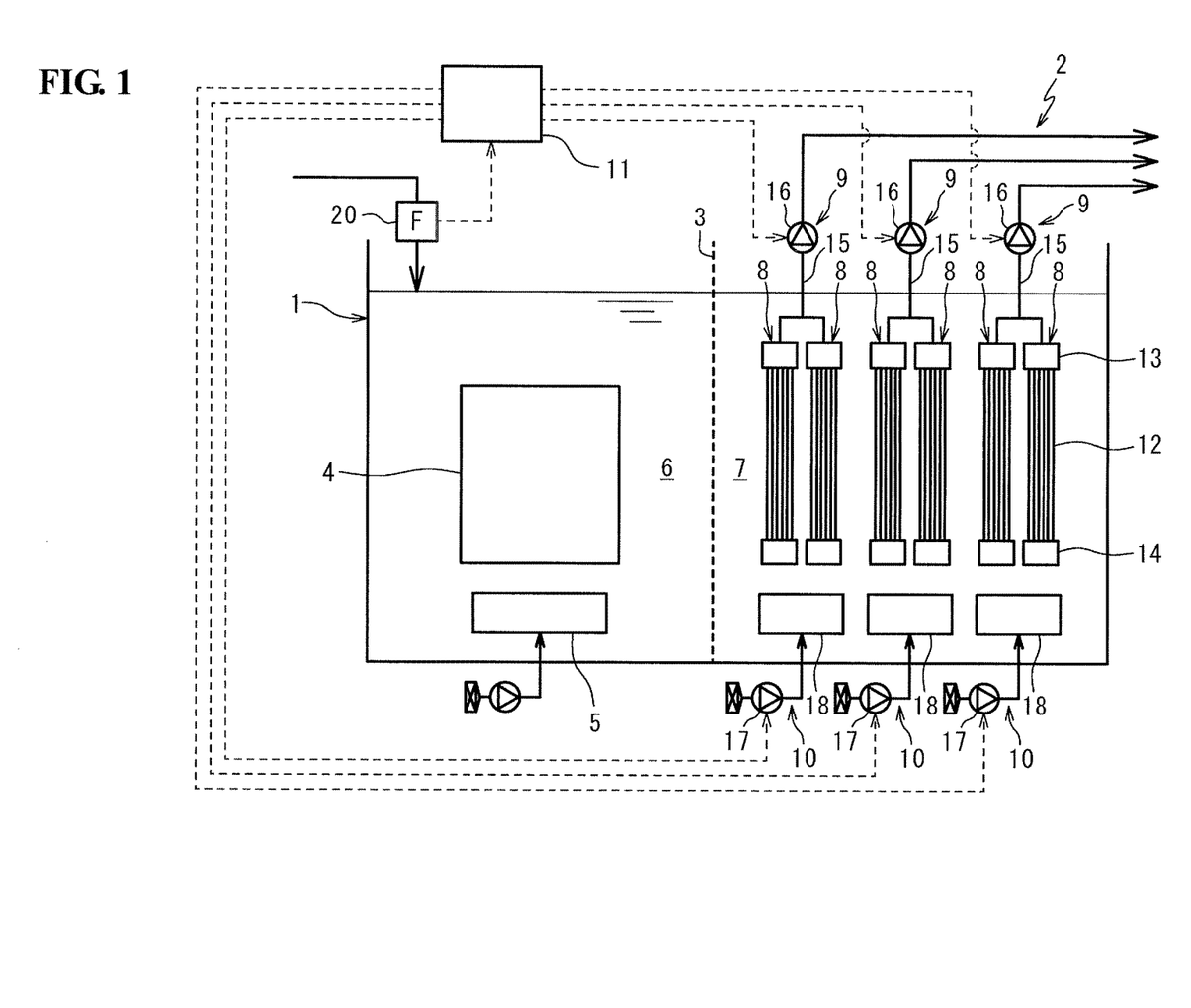
FIG. 1 is a schematic diagram illustrating the configuration of a membrane separation type activated sludge treatment system according to an embodiment of the present invention.

A membrane separation type activated sludge treatment system illustrated in FIG. 1 includes a biological treatment tank 1 in which biological treatment is performed on waste water and a membrane separation apparatus 2 that performs membrane separation on the water treated in the biological treatment tank 1.

The membrane separation type activated sludge treatment system has no adjusting tank for adjusting the inflow rate of the waste water into the biological treatment tank 1. Therefore, the membrane separation type activated sludge treatment system saves installation space and equipment cost.

[Biological Treatment Tank]

The biological treatment tank 1 is a water tank that contains untreated water, which is a mixture of new waste water that flows into the biological treatment tank 1 and waste water that is being treated. The waste water directly flows into the biological treatment tank 1 from a waste water source.

The lower limit of the ratio of the hourly average inflow rate of the waste water that flows into the biological treatment tank 1 to the daily average inflow rate of the waste water is preferably 0.2, more preferably 0.3, and still more preferably 0.5. The upper limit of the ratio of the hourly average inflow rate of the waste water is preferably 2, more preferably 1.6, and still more preferably 1.5. When the ratio of the hourly average inflow rate of the waste water is below the lower limit, there is a risk that the energy source of the activated sludge, which is colonies of microorganisms, will be insufficient and that the amount of activated sludge cannot be maintained and will be reduced due to death of the microorganisms. When the ratio of the hourly average inflow rate of the waste water is above the upper limit, there is a risk that operating energy consumption cannot be sufficiently reduced. In medium-sized and larger cities, the maximum value of the ratio of the hourly average inflow rate of waste water to the daily average inflow rate of waste water is about 1.3 to 1.8 ("Sewage Facility Plan, Design Guidelines and Illustration" Part 1, 2009, Japan Sewage Works Association, p. 40). Therefore, when the ratio of the hourly average inflow rate of the waste water is lower than or equal to the upper limit, operating energy consumption can be reduced, and the membrane separation type activated sludge treatment system can be suitably applied to treatment of waste water in medium-sized and larger cities.

The untreated water within the biological treatment tank 1 contains activated sludge (aerobic microbes). The activated sludge performs oxidative decomposition or absorptive separation on organic substances in the untreated water.

The biological treatment tank 1 includes a partition part 3 so as to be divided into a biological treatment section 6, which includes a support 4, to which activated sludge adheres at a high concentration, and aeration equipment 5, which supplies air to the lower portion of the support 4, and a separation section 7, in which the membrane separation apparatus 2 is disposed. The biological treatment section 6 and the separation section 7 communicate with each other. As described later, treated water is discharged by the membrane separation apparatus 2 from the separation section 7, which causes the untreated water to flow from the biological treatment section 6 into the separation section 7.

(Support)

The support 4 is not particularly limited in terms of structure as long as the structure can maintain adhesion of plural flocs of activated sludge. For example, the support 4 may be a porous membrane having plural pores. The support 4 is also not particularly limited in terms of material, and the material is preferably polytetrafluoroethylene (PTFE) from the viewpoint of strength, chemical resistance, and ease of formation of pores, for example. Incidentally, a flocculant may be employed to make activated sludge adhere to the support 4.

The support 4 may be fixed in the biological treatment tank 1, or may be disposed so as to be swung or moved by the flow. The support 4 is preferably disposed such that air bubbles supplied from the aeration equipment 5 can efficiently supply oxygen to the supported activated sludge.

Incidentally, the activated sludge may be appropriately supplied, with an activated sludge addition tank and an activated sludge addition pipe (not shown), to the biological treatment tank 1 or the support 4. The membrane separation apparatus 2 may include a device that, for example, captures images to observe the amount of activated sludge within the biological treatment tank 1, and automatically supplies activated sludge when the amount of activated sludge becomes a lower limit or less.

The membrane separation apparatus 2 is provided such that, when the amount of activated sludge within the biological treatment tank 1 becomes an upper limit or more, the activated sludge can be removed through the bottom portion of the biological treatment tank 1 or preferably through the bottom portion of the separation section 7. The membrane separation apparatus 2 may have a device that automatically performs this removal of activated sludge.

(Aeration Equipment)

The aeration equipment 5 supplies air containing oxygen to activated sludge in the untreated water within the biological treatment tank 1, in particular, to activated sludge supported by the support 4. In other words, the aeration equipment 5 supplies oxygen to thereby promote a reduction in the amount of organic substances caused by activated sludge.

[Membrane Separation Apparatus]

The membrane separation apparatus 2 includes plural filtration modules 8 capable of filtering the untreated water; plural discharge mechanisms 9 that are connected to the filtration modules 8 and that suck and discharge the treated water that has been filtered by the filtration modules 8 (that operate the filtration modules 8); plural cleaning modules 10 that supply air bubbles from beneath the filtration modules 8; and a control device 11 that controls the discharge mechanisms 9 and the cleaning modules 10.

Since the membrane separation apparatus 2 of the membrane separation type activated sludge treatment system includes the control device 11, as described in detail below, the amount of treated water sucked by each filtration module 8 and the amount of air bubbles supplied by the cleaning modules 10 can be varied in response to variation in the inflow rate of the waste water into the biological treatment tank 1. Thus, according to the membrane separation type activated sludge treatment system, variation in the inflow rate of the waste water can be accommodated without using an adjusting tank.

<Filtration Modules>

Figure 2:
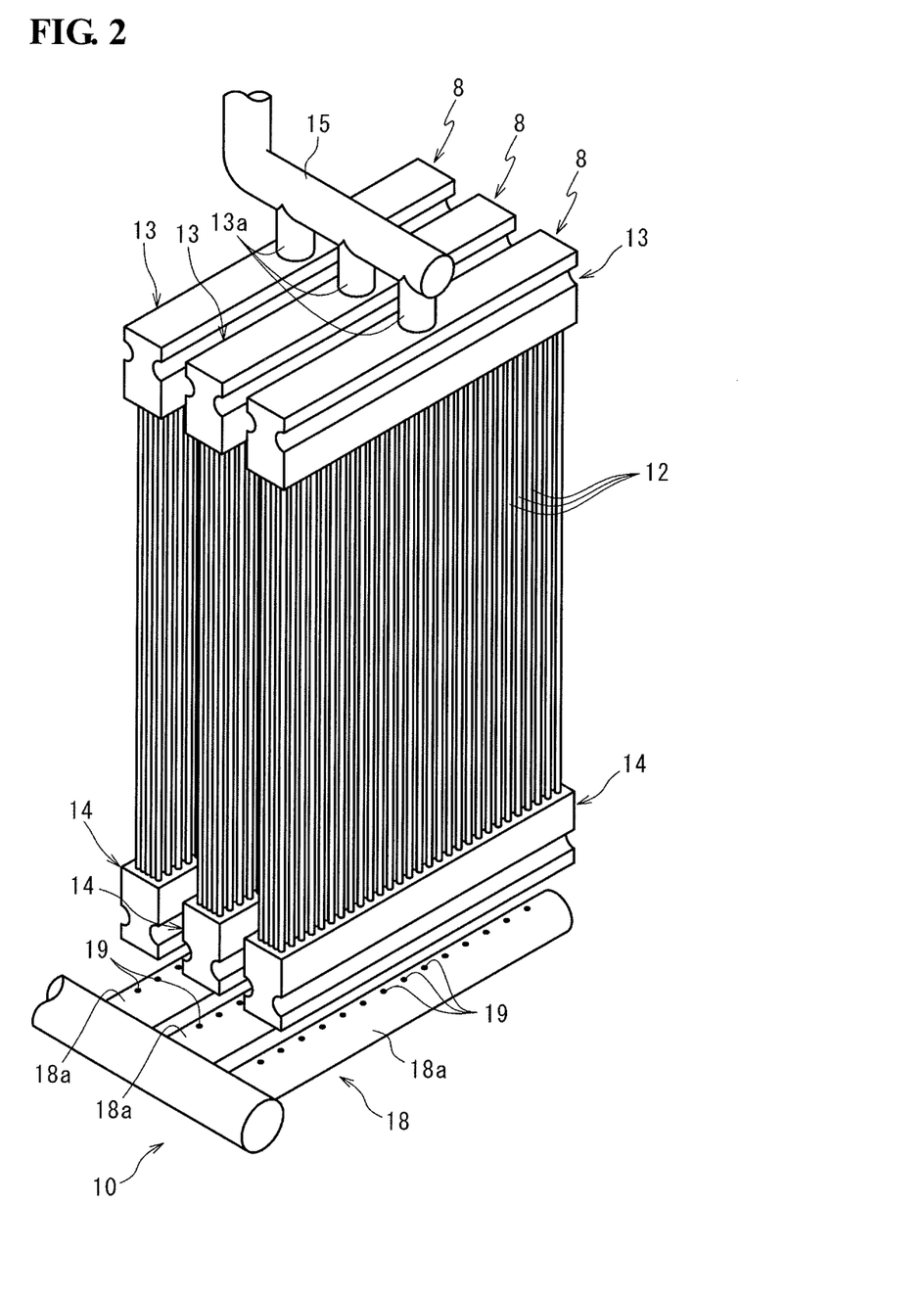
FIG. 2 is a schematic perspective view illustrating a filtration block including filtration modules of a membrane separation apparatus included in the membrane separation type activated sludge treatment system illustrated in FIG. 1.

As illustrated in FIG. 2, the filtration modules 8 include plural hollow fiber membranes 12, which are arranged adjacent to one another and oriented in the upward-downward direction; an upper holding member 13, which fixes the upper ends of the plural hollow fiber membranes 12; and a lower holding member 14, which, together with the upper holding member 13, forms a pair and fixes the lower ends of the plural hollow fiber membranes 12.

In the membrane separation apparatus 2, the plural filtration modules 8 have a configuration in which the upper holding members 13 and the lower holding members 14 are formed so as to have a rod-like shape, and the plural hollow fiber membranes 12 are arranged adjacent to one another in the axial direction (longitudinal direction) of the upper holding members 13 and the lower holding members 14 so as to form a curtain-like shape. In the bundles of the hollow fiber membranes 12 arranged so as to form a curtain-like shape, air bubbles can reach, with relative ease, the central portions (in the thickness direction) of the bundles. This enables high cleaning efficiency of cleaning modules 10 described later.

In the membrane separation apparatus 2, the plural filtration modules 8 are arranged parallel to each other at regular intervals. Stated another way, in the plural filtration modules 8, the upper holding members 13 are held such that their longitudinal axes are arranged parallel to each other at regular intervals, and the lower holding members 14 are held such that their longitudinal axes are arranged parallel to each other at regular intervals.

In each filtration module 8, the upper holding member 13 and the lower holding member 14, which form a pair, are preferably held such that the distance (linear distance) between the pair is shorter than the average effective length of the hollow fiber membranes 12, so that the plural hollow fiber membranes 12 have slack. More specifically, the average effective length of the hollow fiber membranes 12 is preferably larger than the average linear distance between both ends of the effective region (linear distance between the center of the lower surface of a hollow-fiber-membrane-12-holding portion of the upper holding member 13 and the center of the upper surface of a hollow-fiber-membrane-12-holding portion of the lower holding member 14). Incidentally, the "average effective length" is the average of lengths (along the central axes) of portions of the hollow fiber membranes, the portions not being held by the holding members.

Thus, the hollow fiber membranes 12 have slack, which facilitates entry of air bubbles into the bundles of the hollow fiber membranes 12. In addition, the hollow fiber membranes 12 swing and the resultant vibrations can enhance the cleaning effect.

(Hollow Fiber Membranes)

The hollow fiber membranes 12 are porous membranes that are permeable to water, but prevent impurities contained in untreated water from passing therethrough, and that are formed so as to have a tubular shape.

The hollow fiber membranes 12 may be formed of a thermoplastic resin as a main component. Examples of the thermoplastic resin include polyethylene, polypropylene, polyvinylidene fluoride, ethylene-vinyl alcohol copolymers, polyamide, polyimide, polyetherimide, polystyrene, polysulfone, polyvinyl alcohol, polyphenylene ether, polyphenylene sulfide, acetylcellulose, polyacrylonitrile, and polytetrafluoroethylene (PTFE). Of these, preferred is a PTFE that has porous property and is excellent in terms of, for example, mechanical strength, chemical resistance, heat resistance, weather resistance, and flame resistance; more preferred is a uniaxially or biaxially expanded PTFE. Incidentally, the material for forming the hollow fiber membranes 12 may appropriately contain, for example, another polymer and additives such as a lubricant.

(Upper Holding Members)

The upper holding members 13 each have an internal space that communicates with the lumens of the plural hollow fiber membranes 12 held by the upper holding member 13. The upper holding members 13 have a drainage nozzle 13a for discharging, from the internal space, water having been treated by filtration through the hollow fiber membranes 12.

(Lower Holding Members)

The lower holding members 14 hold the lower ends of the hollow fiber membranes 12. The lower holding members 14 may have an internal space as in the upper holding members 13, or may hold the lower ends of the hollow fiber membranes 12 so as to block the openings of the hollow fiber membranes 12.

Incidentally, the filtration modules 8 may include a coupling member that couples the upper holding member 13 and the lower holding member 14 together in order to facilitate handling (for example, transportation, installation, and replacement). Examples of the coupling member include a support rod formed of metal and a casing (outer cylinder) formed of resin.

<Discharge Mechanisms>

The discharge mechanisms 9 constitute suction systems that suction treated water from plural filtration modules 8.

Stated another way, the plural filtration modules 8 in the membrane separation apparatus 2 are divided into plural filtration blocks as illustrated in FIG. 2; and, for each filtration block, a discharge mechanism 9 that suctions treated water is disposed.

Specifically, the plural discharge mechanisms 9 each include a water collecting pipe 15 and a suction pump 16. The water collecting pipe 15 is connected to the drainage nozzles 13a of the plural filtration modules 8 and collects treated water provided by filtration of untreated water through the hollow fiber membranes 12. The suction pump 16 suctions treated water through the water collecting pipe 15.

In the membrane separation type activated sludge treatment system, the plural filtration modules 8 are provided as plural filtration blocks each including filtration modules 8 that share a suction system, and the control device 11 controls the suction pumps 16 provided for the respective filtration blocks. Accordingly, in the membrane separation type activated sludge treatment system, the number of discharge mechanisms 9 controlled by the control device 11, that is, the number of filtration blocks, is smaller than the number of filtration modules 8. Therefore, control for accommodating variation in the inflow rate of the waste water can be simplified.

<Cleaning Modules>

As illustrated in FIGS. 1 and 2, the cleaning modules 10 are disposed beneath the plural filtration modules 8. The cleaning modules 10 are preferably arranged so as to correspond to respective filtration blocks. When the cleaning modules 10 are arranged so as to correspond to respective filtration blocks, the control device 11 can control each cleaning module 10 and a corresponding one of the discharge mechanisms 9 together as a set. More specifically, the control device 11 can use information for controlling each suction pump 16 to determine the amount of air bubbles to be supplied by a corresponding one of the cleaning modules 10. Thus, control of the cleaning modules 10 performed by the control device 11 can be simplified.

The cleaning modules 10 are modules at least configured to eject air bubbles. For example, as illustrated in FIG. 1 and FIG. 2, the cleaning modules 10 may include air suppliers 17, which supply air, and plural air headers 18, which are disposed beneath the filtration modules 8; and, in each of the air headers 18, plural air bubble ejection ports 19 may be formed.

(Air Suppliers)

Examples of the air suppliers 17 include a blower and a compressor.

(Air Headers)

The air headers 18 may be constituted by, for example, pipes. More specifically, as illustrated in FIG. 2, the air headers 18 preferably include one or more pipes 18a, which are provided in a one-to-one relationship with the filtration modules 8 and extend along a presence region of the hollow fiber membranes 12 in plan view. The air bubble ejection ports 19 may be formed in a line in each of the pipes 18a.

(Air Bubble Ejection Ports)

The air bubble ejection ports 19 are preferably formed in a line in the longitudinal direction of the presence region of the hollow fiber membranes 12. When the air bubble ejection ports 19 are formed in a line in the longitudinal direction of the presence region, air bubbles released through the air bubble ejection ports 19 rise along the curtain-like bundles of the hollow fiber membranes 12 and scrub the hollow fiber membranes 12, to thereby efficiently remove suspensoids and the like adhering to the outer circumferential surfaces of the hollow fiber membranes 12.

<Control Device>

The control device 11 varies the amount of treated water sucked by the filtration modules 8 and the amount of air bubbles supplied by the cleaning modules 10 in response to variation in the inflow rate of the waste water into the biological treatment tank 1. More specifically, the control device 11 controls the amount of treated water sucked by the filtration modules 8 and the amount of air bubbles supplied by the cleaning modules 10 on the basis of an input signal from a sensor 20 that detects the inflow rate of the waste water into the biological treatment tank 1.

The control device 11 may be, for example, a personal computer or a programmable logic controller. The sensor 20 may be, for example, a flowmeter that detects the inflow rate of the waste water into the biological treatment tank 1. An example of a flowmeter suitable for measurement of the inflow rate of the waste water is a weir meter.

The amount of treated water sucked by the filtration modules 8 (suction pumps 16) is preferably controlled so that the difference between the inflow rate of the waste water detected by the sensor 20 and the total outflow of the treated water from the filtration modules 8 approaches 0. In other words, the control device 11 preferably performs control so as to increase or reduce the amount of suction by the suction pumps 16 (filtration blocks) in response to an increase or reduction in the inflow rate of the waste water. Also, the amount of air bubbles supplied by the cleaning modules 10 is preferably increased or reduced in response to an increase or reduction in the amount of suction by the suction pumps 16. In other words, the control device 11 preferably controls the amount of air bubbles supplied by the cleaning modules 10 in response to the amount of suction by the filtration modules 8 (suction pumps 16).

A control method for increasing or reducing the amount of suction by the suction pumps 16 and the amount of air bubbles supplied by the cleaning modules 10 is not particularly limited. For example, known PID control may be used.

Figure 3:
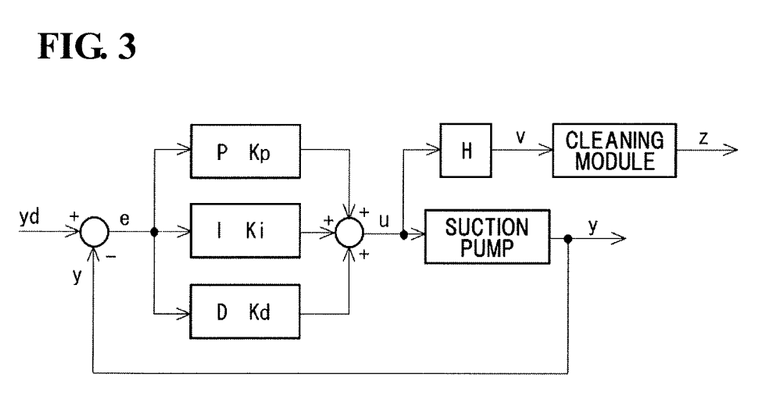
FIG. 3 is a flow diagram of a control flow of a control device included in the membrane separation type activated sludge treatment system illustrated in FIG. 1.

FIG. 3 illustrates a control flow of the control device 11 that uses PID control. First, the control device 11 calculates the difference e between the inflow rate yd of the waste water detected by the sensor 20 and the total outflow y of the treated water from the filtration modules 8. This process is performed by checking the detection value of the sensor 20 at constant time intervals. The PID control operates so that e approaches 0. More specifically, an amount of control u is obtained by adding a proportional element obtained by multiplying the difference e by a proportional gain Kp in proportional control P, an integral element obtained by multiplying the accumulated value of the difference e by an integral gain Ki in integral control I, and a derivative element obtained by multiplying the difference between the difference e in the previous cycle and that in the current cycle by a derivative gain Kd in derivative control D. The proportional element is a basic element that increases as the difference e increases and that causes the difference to approach 0. The integral element is an element that increases when the difference e accumulates and that prevents the total outflow y from deviating from the inflow rate yd of the waste water. The derivative element is an element that increases when the difference e in the current cycle greatly differs from that in the previous cycle, that is, when the inflow rate yd of the waste water rapidly changes, and that enables quick response to such a rapid change. The control device 11 increases or reduces the amount of suction by the suction pumps 16 based on the amount of control u. Thus, the total outflow y of the treated water from the filtration modules 8 approaches the inflow rate yd of the waste water, which is a target value.

An amount of control v for the amount of air bubbles supplied by the cleaning modules 10 can be determined by using a function H whose argument is the amount of control u of the amount of suction by the suction pumps 16. Thus, the control device 11 can control the amount z of air bubbles supplied by the cleaning modules 10 in response to the amount y of suction by the filtration modules 8 (suction pumps 16).

The control device 11 preferably varies the amount of air bubbles supplied by the cleaning modules 10 so that the variation rate of the amount of air bubbles supplied by the cleaning modules 10 is greater than the variation rate of the amount of suction by the filtration modules 8. The inventors of the present invention have found that when, for example, the amount of suction by the filtration modules 8 is halved, the cleaning performance required to clean the filtration modules 8 can be maintained even when the amount of air bubbles supplied to the filtration modules 8 is reduced to less than half. A conceivable reason for this is as follows. That is, when the amount of suction by the filtration modules 8 is halved, the flux of the untreated water that passes through the hollow fiber membranes 12 included in the filtration modules 8 is also halved. In addition, the reduction in the flow velocity leads to a reduction in the suction force applied to the activated sludge and the like, and therefore the amount of activated sludge that adheres to the hollow fiber membranes 12 becomes less than half the amount before the change in the amount of suction. Therefore, it can be expected that even when the amount of air bubbles supplied to the filtration modules 8 is reduced to less than half the amount before the change, the cleaning performance required to clean the filtration modules 8 can be maintained. Therefore, by setting the variation rate of the amount of air bubbles supplied by the cleaning modules 10 to be greater than the variation rate of the amount of suction by the filtration modules 8, operating energy consumption can be reduced while maintaining the cleaning performance required to clean the filtration modules 8. The method for setting the variation rate of the amount of air bubbles supplied by the cleaning modules 10 to be greater than the variation rate of the amount of suction by the filtration modules 8 is not particularly limited. For example, $Kq \times u^n$ (n is an odd number and Kq is a constant) may be used as the function H in FIG. 3.

The lower limit of the ratio of the variation rate of the amount of air bubbles supplied by the cleaning modules 10 to the variation rate of the amount of suction by the filtration modules 8 is preferably 1.05, more preferably 1.1, and still more preferably 1.2. The upper limit of the ratio of the variation rate of the amount of air bubbles supplied by the cleaning modules 10 is preferably 1.4, more preferably 1.35, and still more preferably 1.3. When the ratio of the variation rate of the amount of air bubbles supplied by the cleaning modules 10 is below the lower limit, there is a risk that operating energy consumption cannot be sufficiently reduced. When the ratio of the variation rate of the amount of air bubbles supplied by the cleaning modules 10 is above the upper limit, there is a risk that the cleaning performance of the air bubbles supplied by the cleaning modules 10 will be insufficient.

The lower limit of the ratio of the hourly average amount of air bubbles supplied by the cleaning modules 10 to a standard amount of air bubbles supplied by the cleaning modules 10 when treating a daily average inflow rate of waste water is preferably 0.1, more preferably 0.2, and still more preferably 0.3. The upper limit of the ratio of the hourly average amount of air bubbles supplied by the cleaning modules 10 is preferably 4, more preferably 3.5, and still more preferably 3. When the ratio of the hourly average amount of air bubbles supplied by the cleaning modules 10 is below the lower limit, there is a risk that the cleaning performance of the cleaning module 10 will be insufficient. When the ratio of the hourly average amount of air bubbles supplied by the cleaning modules 10 is above the upper limit, there is a risk that operating energy consumption cannot be sufficiently reduced.

The control device 11 preferably performs control so that the plural filtration modules 8 and the plural cleaning modules 10 operate continuously. When continuous operation is performed, there is no period in which the filtration modules 8 are stopped. Therefore, the average amount of suction by the filtration modules 8 is smaller than that in the case where intermittent operation is performed. In addition, in the case where the amount of suction by the filtration modules 8 is small, the cleaning performance required to clean the filtration modules 8 can be maintained even when the amount of air bubbles supplied to the filtration modules 8 by the cleaning modules 10 is reduced at a ratio greater than or equal to a ratio between the average amount of suction in continuous operation and the average amount of suction in intermittent operation. Therefore, the total operating energy consumption of the filtration modules 8 and the cleaning modules 10 is lower than that in intermittent operation.

The control device 11 preferably controls the plural filtration modules 8 so that substantially the same amount of treated water is sucked by each filtration module 8. When the filtration modules 8 are controlled so that substantially the same amount of treated water is sucked by each filtration module 8, the total operating energy consumption of the membrane-separated activated sludge treatment can be further reduced. Even when the control device 11 controls the suction pumps 16 so that the outputs of the suction pumps 16 are the same, the amounts of suction by the filtration modules 8 may differ due to, for example, dependence on the locations of the filtration modules 8. In such a case, the control device 11 may control the filtration modules 8 based on information obtained by sensors or the like that detect the amounts of suction by the suction pumps 16 so that the differences between the amounts of suction by the suction pumps 16 are reduced while the total outflow of the treated water is maintained.

[Membrane Separation Type Activated Sludge Treatment Method]

A membrane separation type activated sludge treatment method according to an embodiment of the present invention performed by using the membrane separation type activated sludge treatment system will now be described.

The membrane separation type activated sludge treatment method includes a step of performing biological treatment on waste water and a step of performing membrane separation on water having been treated in the biological treatment step.

<Biological Treatment Step>

In the biological treatment step, organic substances contained in untreated water that derives from the waste water are subjected to oxidative decomposition or absorption separation by the activated sludge mainly in the biological treatment section 6 of the biological treatment tank 1.

<Membrane Separation Step>

In the membrane separation step, treated water is obtained by filtering the untreated water by using the filtration modules 8 and the discharge mechanisms 9 of the membrane separation apparatus 2.

In the membrane separation step, the amount of treated water sucked by the filtration modules 8 and the amount of air bubbles supplied by the cleaning modules 10 are varied in response to variation in the inflow rate of the waste water in the biological treatment step.

[Advantages]

In the membrane separation type activated sludge treatment system, by varying the amount of treated water sucked by the filtration modules 8 in response to variation in the inflow rate of the waste water into the biological treatment tank 1 (biological treatment step), the outflow of the treated water is regulated so that the flux of the untreated water that passes through the hollow fiber membranes 12 does not exceed the flow rate at which clogging of the hollow fiber membranes 12 occurs. Accordingly, the membrane separation type activated sludge treatment system does not require any adjusting tank. In addition, in the membrane separation type activated sludge treatment system, the amount of treated water sucked by the filtration modules 8 and the amount of air bubbles supplied by the cleaning modules 10 are varied in response to variation in the inflow rate of the waste water into the biological treatment tank 1. Therefore, the energy required to suck the treated water and supply the air bubbles can be minimized. Thus, according to the membrane separation type activated sludge treatment system, operating energy consumption can be reduced and variation in the inflow rate of the waste water can be accommodated without using an adjusting tank.

Other Embodiments

It is to be understood that the embodiment disclosed herein is an example and not restrictive in all respects. The scope of the present invention is not limited by the configuration of the above-described embodiment but is defined by the claims, and is intended to include equivalents to the scope of the claims and all modifications within the scope of the claims.

In the above-described embodiment, the biological treatment tank of the membrane separation type activated sludge treatment system has a partition part, and the untreated water that flows into the separation section from the biological treatment section is treated. However, the partition part is not an essential element, and may be omitted. When the partition part is omitted, in the membrane-separated activated sludge treatment performed by the membrane separation type activated sludge treatment system, the biological treatment and membrane separation are performed on the untreated water in parallel in the biological treatment tank.

The membrane separation type activated sludge treatment system may include a biological treatment tank in which the untreated water is subjected to biological treatment and a filtration tank in which the filtration modules are disposed and in which the untreated water is filtered. The untreated water may be supplied from the biological treatment tank to the filtration tank, and the sludge may be returned from the filtration tank to the biological treatment tank.

The membrane separation type activated sludge treatment system may include a discharge mechanism for each filtration module, and the amount of treated water sucked by each filtration module may be varied by controlling the filtration modules individually.

Each cleaning module of the membrane separation type activated sludge treatment system may include, for example, a tank that stores compressed air supplied from a compressor or the like as the air supplier. When a tank that stores compressed air is used as the air supplier, the energy efficiency of the air supplier is not easily reduced even when the air supplier is used by multiple cleaning modules.

In the membrane separation type activated sludge treatment system and the membrane separation type activated sludge treatment method, the inflow rate of the waste water may be detected by using, for example, a level indicator that detects a liquid level in the biological treatment tank. More specifically, the inflow rate of the waste water into the biological treatment tank can be calculated based on an amount of change in the amount of untreated water into the biological treatment tank detected by the level indicator and the outflow of the untreated water through the filtration modules in operation. When a level indicator is used, the amount of treated water sucked by the filtration modules may be controlled so as to be varied in response to the inflow rate of the waste water indirectly instead of numerically calculating the inflow rate of the waste water. In an example of such a control method, the liquid level in the biological treatment tank is determined by using the level indicator at constant time intervals, and the suction pumps are controlled so that the amount of suction is set to an amount determined in advance in correspondence with the liquid level.

The membrane separation type activated sludge treatment system may include an adjusting tank for adjusting the inflow rate of the waste water. When, for example, an adjusting tank having a relatively small capacity is used, the peak inflow rate of the waste water can be reduced, and the number of filtration modules to be arranged can also be reduced.

REFERENCE SIGNS LIST 1 biological treatment tank
2 membrane separation apparatus
3 partition part
4 support
5 aeration equipment
6 biological treatment section
7 separation section
8 filtration module
9 discharge mechanism
10 cleaning module
11 control device
12 hollow fiber membrane
13 upper holding member
13a drainage nozzle
14 lower holding member
15 water collecting pipe
16 suction pump
17 air supplier
18 air header
18a pipe
19 air bubble ejection port
20 sensor

The invention claimed is:

1. A membrane separation activated sludge treatment method comprising: a step of performing biological treatment on waste water; and a step of performing membrane separation on water having been treated in the biological treatment step, wherein the membrane separation step employs a plurality of filtration modules including a plurality of hollow fiber membranes arranged adjacent to one another and oriented in one direction and a pair of holding members fixing both ends of the plurality of hollow fiber membranes, and a plurality of cleaning modules supplying air bubbles from beneath the filtration modules, an amount of treated water sucked by the filtration modules and an amount of air bubbles supplied by the cleaning modules are varied in response to variations in an inflow rate of the waste water in the biological treatment step, and the amount of air bubbles supplied by the cleaning modules is varied so that a variation rate of the amount of air bubbles supplied by the cleaning modules is greater than a variation rate of the amount of suction by the filtration modules.

2. The membrane separation activated sludge treatment method according to claim 1, wherein a ratio of an hourly average amount of air bubbles supplied by the cleaning modules to a standard amount of air bubbles supplied by the cleaning modules when treating a daily average inflow rate of waste water is in a range from 0.1 to 4.

3. The membrane separation activated sludge treatment method according to claim 1, wherein a ratio of an hourly average inflow rate of the waste water to a daily average inflow rate of the waste water in the biological treatment step is in a range from 0.2 to 2.

4. The membrane separation activated sludge treatment method according to claim 1, wherein the plurality of filtration modules and the plurality of cleaning modules are continuously operated.

5. A membrane separation activated sludge treatment system comprising: a tank configured to perform biological treatment on waste water, and an apparatus configured to perform membrane separation on water having been treated in the biological treatment tank, wherein the membrane separation apparatus includes a plurality of filtration modules including a plurality of hollow fiber membranes arranged adjacent to one another and oriented in one direction and a pair of holding members fixing both ends of the plurality of hollow fiber membranes, and a plurality of cleaning modules supplying air bubbles from beneath the filtration modules, an amount of treated water sucked by the filtration modules and an amount of air bubbles supplied by the cleaning modules are varied in response to variations in an inflow rate of the waste water into the biological treatment tank, and the amount of air bubbles supplied by the cleaning modules is varied so that a variation rate of the amount of air bubbles supplied by the cleaning modules is greater than a variation rate of the amount of suction by the filtration modules.

6. The membrane separation activated sludge treatment system according to claim 5, wherein no tank for adjusting the inflow rate of the waste water into the biological treatment tank is provided.

* * * * *